United States Patent [19]
Forester

[11] Patent Number: 5,183,554
[45] Date of Patent: Feb. 2, 1993

[54] METHOD FOR CONTROLLING FOULING DEPOSIT FORMATION IN A LIQUID HYDROCARBONACEOUS MEDIUM

[75] Inventor: David R. Forester, Conroe, Tex.

[73] Assignee: Betz Laboratories, Inc., Trevose, Pa.

[21] Appl. No.: 756,813

[22] Filed: Sep. 9, 1991

[51] Int. Cl.$^5$ .................. C10G 9/12; C10G 9/16
[52] U.S. Cl. .................. 208/48 AA; 208/48 R; 585/950
[58] Field of Search ............ 208/48 AA, 48 R; 585/950

[56] References Cited

U.S. PATENT DOCUMENTS

| | | | |
|---|---|---|---|
| 3,172,892 | 3/1965 | Suer et al. | 260/326.5 |
| 3,235,484 | 2/1966 | Colfer | 208/48 AA |
| 3,437,583 | 4/1969 | Gonzalez | 208/48 AA |
| 4,578,178 | 3/1986 | Forester | 208/48 AA |
| 4,775,459 | 10/1988 | Forester | 208/48 AA |
| 4,803,004 | 2/1989 | Andress et al. | 252/51.5 A |
| 4,883,886 | 11/1989 | Huang | 549/255 |
| 4,895,579 | 1/1990 | Andress | 44/331 |

*Primary Examiner*—Theodore Morris
*Assistant Examiner*—Walter D. Griffin
*Attorney, Agent, or Firm*—Alexander D. Ricci; Bruce E. Peacock

[57] ABSTRACT

Reaction products of (a) polyalkenylsuccinic anhydride; (b) secondary, aromatic amines, and (c) hindererd alcohols are used as effective antifoulants in liquid hydrocarbonaceous mediums, such as crude oils and gas oils, during processing of such liquids at elevated temperatures. The reaction products are formed via a two-step reaction in which the polyalkenylsuccinic anhydride is reacted with the secondary, aromatic amine as a first step. The resulting polyalkenylsuccinimide is then reacted with a hindererd alcohol to form the desired antifoulant.

5 Claims, No Drawings

METHOD FOR CONTROLLING FOULING DEPOSIT FORMATION IN A LIQUID HYDROCARBONACEOUS MEDIUM

FIELD OF THE INVENTION

The present invention pertains to the use of hindered alcohol-modified polyalkenylsuccinimides to inhibit fouling in liquid hydrocarbon mediums during the heat treatment processing of the medium, such as in refinery processes.

BACKGROUND OF THE INVENTION

In the processing of petroleum hydrocarbons and feedstocks, such as petroleum processing intermediates, and petrochemicals and petrochemical intermediates, e.g., gas, oils and reformer stocks, chlorinated hydrocarbons and olefin plant fluids, such as deethanizer bottoms, the hydrocarbons are commonly heated to temperatures of 40° to 550° C., frequently from 200°-550° C. Similarly, such petroleum hydrocarbons are frequently employed as heating mediums on the "hot side" of heating and heating exchange systems. In both instances, the petroleum hydrocarbon liquids are subjected to elevated temperatures which produce a separate phase known as fouling deposits, within the petroleum hydrocarbon. In all cases, these deposits are undesirable by-products. In many processes, the deposits reduce the bore of conduits and vessels to impede process throughput, impair thermal transfer, and clog filter screens, valves and traps. In the case of heat exchange systems, the deposits form an insulating layer upon the available surfaces to restrict heat transfer and necessitate frequent shut-downs for cleaning. Moreover, these deposits reduce throughput, which of course results in a loss of capacity with a drastic effect in the yield of finished product. Accordingly, these deposits have caused considerable concern to the industry.

While the nature of the foregoing deposits defies precise analysis, they appear to contain either a combination of carbonaceous phases which are coke-like in nature, polymers or condensates formed from the petroleum hydrocarbons or impurities present therein and/or salt formations which are primarily composed of magnesium, calcium and sodium chloride salts. The catalysis of such condensates has been attributed to metal compounds such as copper or iron which are present as impurities. For example, such metals may accelerate the hydrocarbon oxidation rate by promoting degenerative chain branching, and the resultant free radicals may initiate oxidation and polymerization reactions which form gums and sediments. It further appears that the relatively inert carbonaceous deposits are entrained by the more adherent condensates or polymers to thereby contribute to the insulating or thermal opacifying effect.

Fouling deposits are equally encountered in the petrochemical field wherein the petrochemical is either being produced or purified. The deposits in this environment are primarily polymeric in nature and do drastically affect the economies of the petrochemical process. The petrochemical processes include processes ranging from those where ethylene or propylene, for example, are obtained to those wherein chlorinated hydrocarbons are purified.

Other somewhat related processes where antifoulants may be used to inhibit deposit formation are the manufacture of various types of steel or carbon black.

SUMMARY OF THE INVENTION

In accordance with the invention, polyalkenylsuccinimides, formed via reaction of polyalkenylsuccinic acid, anhydride or mono- or diester thereof, with a secondary, aromatic amine, are further reacted with a hindered alcohol. The resulting reaction products are used to inhibit fouling of heated liquid hydrocarbon mediums. Typically, such antifoulant protection is provided during heat processing of the medium, such as in refinery, purification, or production processes.

Preferably, a polyalkenylsuccinic anhydride is reacted with diphenylamine to form the intermediate, with subsequent reaction of the intermediate with pentaerythritol yielding the desired antifoulant, suited for antifouling protection of hot hydrocarbon process fluids.

PRIOR ART

Reaction products, of the type used herein to control fouling in hot process fluids, are disclosed in U.S. Pat. Nos. 4,895,579 (Andress et al) and 4,803,004 (Andress et al). In accordance with the '579 and '004 disclosures, the reaction products are used in conjunction with a lubricating oil or grease to impart dispersant and antioxidant characteristics thereto. Efficacy in these disclosures is assessed by the 1-G Caterpillar engine test used to evaluate the effects of a candidate material on piston deposits. In contrast, the present invention calls for inhibition of fouling in liquid hydrocarbonaceous mediums during the high temperature processing of the medium. Studies have indicated that many compounds known to be useful as lubricating oil detergent-dispersants do not adequately function as process antifoulants during heat treatment processing of the treated medium.

Of interest to the use of succinic acid and succinic anhydride derivatives is U.S. Pat. No. 3,235,484 (Colfer et al) which discloses amine reaction products of succinic acid and succinic anhydrides. These materials are used to inhibit carbonaceous material formation in refinery cracking units. U.S. Pat. No. 3,172,892 (LeSuer et al) teaches the use of high molecular weight succinimides as dispersants in lubricating compositions with Gonzalez in U.S. Pat. No. 3,437,583 teaching combinations of metal deactivator, phenolic compound, and substituted succinic acid or anhydride used to inhibit fouling in hydrocarbon process fluids.

One particularly successful group of antifoulants is reported in U.S. Pat. No. 4,578,178 (Forester—of common assignment herewith). This patent discloses the use of polyalkenylthiophosphonic acid esters as antifoulants in heat treated hydrocarbon mediums with the Group II(a) cation salts of such acids being specified in U.S. Pat. No. 4,775,459 (Forester—of common assignment herewith).

DETAILED DESCRIPTION

I have found that reaction products of (a) polyalkenylsuccinic anhydride, acid or its simple ($C_1$–$C_6$ alkyl) mono- or diesters, (b) a secondary, aromatic amine, and (c) a hindered alcohol, provide significant antifoulant efficacy in liquid hydrocarbonaceous mediums during the high temperature treatment of the medium.

It is to be understood that the phrase "liquid hydrocarbonaceous medium" as used herein signifies various and sundry petroleum hydrocarbon and petrochemicals. For instance, petroleum hydrocarbons such as petroleum hydrocarbon feedstocks including crude oils and fractions thereof such as naphtha, gasoline, kerosene, diesel, jet fuel, fuel oil, gas oil, vacuum residua, etc., are all included in the definition.

Similarly, petrochemicals such as olefinic or naphthenic process streams, aromatic hydrocarbons and their derivatives, ethylene dichloride, and ethylene glycol are all considered to be within the ambit of the phrase "liquid hydrocarbonaceous mediums".

The reaction products are prepared in accordance with the disclosures of U.S. Pat. Nos. 4,895,579 and 4,803,004 (Andress et al)—herein incorporated by reference. In the first step of the reaction, a polyalkenylsuccinic anhydride, acid, or its simple $C_1$–$C_6$ alkyl mono- or diesters (all referred to for convenience herein in the anhydride form) is reacted with a secondary, aromatic amine. The resulting polyalkenylsuccinimide is then reacted with a hindered alcohol.

Polyalkenylsuccinic acids, anhydride, and its simple esters are commercially available. The preferred starting reactant, polyalkenylsuccinic anhydride may be purchased commercially or prepared. Presently, it is preferred to buy the precursor polyalkenylsuccinic anhydride from Texaco. This product is sold under the trademark TLA-627. It is a polyisobutenylsuccinic anhydride (PIBSA) having the structure

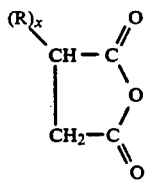  (I)

wherein, in this case, R is an isobutenyl repeat unit. The average molecular weight of the polyisobutene used to produce the PIBSA is about 1300.

The precursor polyalkenylsuccinic anhydride may also be prepared as reported in U.S. Pat. No. 3,235,484 (Colfer), incorporated herein by reference or, more preferably, by the methods reported in U.S. Pat. No. 4,883,886 (Huang) also incorporated by reference herein. As to the Colfer method, the anhydrides are formed by reaction of maleic anhydride with a high molecular weight olefin or a chlorinated high molecular weight olefin. In the preferred Huang method, reaction of a polymer of a $C_2$–$C_8$ olefin and maleic anhydride are carried out in the presence of a tar and side product suppressing agent.

The most commonly used sources for forming the aliphatic R substituent on the succinic anhydride compound are the polyolefins, such as polyethylene, polypropylene, polyisobutene, polyamylene, polyisohexylene, etc. The most particularly preferred polyolefin (and the one used to manufacture the polyisobutenylsuccinic anhydride from Texaco) is polyisobutene. As Colfer states, particular preference is made for such a polyisobutene-containing at least about 50 carbon atoms, preferably from at least 60 carbon atoms and most desirably from about 100 to about 130 carbon atoms. Accordingly, an operable carbon atom number range for R is from about 30–200 carbon atoms.

Once the polyalkenylsuccinic anhydride, acid or ester is obtained, it is reacted with an aromatic secondary amine, having the formula

  (II)

wherein $R_2$ and $R_3$ are independently chosen from aryl, i.e., phenyl, naphthyl, etc., or $C_1$–$C_{18}$ alkylaryl. Exemplary aromatic, secondary amines include diphenylamine, di-t-octyl diphenylamine, 4-t-pentyldiphenylamine, N-p-t-pentylphenyl-alpha-naphthylamine, etc., all as stated in aforementioned U.S. Pat. Nos. 4,895,579 and 4,803,004 (Andress). The preferred amine is diphenylamine.

After the reaction of (I) and (II), the polyalkenylsuccinimide intermediate is reacted with a hindered alcohol of the formula

  (III)

wherein $R_4$, $R_5$, and $R_6$ are independently selected from H, $CH_2OH$, and OH; and where $R_7$ is $CH_2OH$, $CH_2OH$ substituted lower alkyl ($C_1$–$C_6$), OH substituted lower alkyl ($C_1$–$C_6$), $CH_2OH$ and OH substituted lower alkyl ($C_1$–$C_6$), $CH_2$—O—$R_8$ or —O—$R_8$ wherein $R_8$ is lower alkyl ($C_1$–$C_6$), OH substituted lower alkyl ($C_1$–$C_6$) or $CH_2OH$ substituted lower alkyl ($C_1$–$C_6$).

As per U.S. Pat. No. 4,895,579, such hindered alcohols may, for example, comprise pentaerythritol, (including commercially available mixtures of pentaerythritol and dipentaerythritol) trimethylolpropane, trimethylolethane, trimethyl-1,3-pentanediol, neopentyl glycol, trimethylolbutane, etc. Pentaerythritol is the preferred hindered alcohol.

The reaction of the precursor polyalkenylsuccinic anhydride, acid or ester (I) with secondary, aromatic amine (II) may be conducted at temperatures in excess of 80° C. with the use of a solvent medium, such as benzene, xylene, toluene, naphtha, mineral oil, n-hexane, etc. Preferably, the reaction is conducted at from 100°–250° C. with a molar amount of (I): (II) being from about 1:5 to about 5:1 with a molar amount of about 1:1 being preferred.

After cooling of the resulting reaction mixture containing the intermediate imide, hindered alcohol is added, with stirring, in a molar amount of 0.5–1.5 hindered alcohol per mole of amine used. This second reaction step is generally conducted at temperatures in excess of 150° C. The resulting reaction product can be dispersed in a carrier liquid or dissolved in a non-polar solvent, such as mineral oil.

Based upon preliminary experimental data, the preferred reaction product for use in accordance with the invention is formed from (a) polyisobutenylsuccinic anhydride (Mw isobutenyl moiety ≈ 1300); (b) diphenylamine, and (c) pentaerythritol in a 1:1:.7 molar ratio.

The reaction product useful in the invention may be added to or dispersed within the liquid hydrocarbonaceous medium in need of antifouling protection in an amount of 0.5–10,000 ppm based upon one million parts of the liquid hydrocarbonaceous medium. Preferably, the antifoulant is added in an amount of from 1 to 2500 ppm.

The reaction products may be dissolved in a polar or non-polar organic solvent, such as heavy aromatic naphtha, toluene, xylene, or mineral oil and fed to the requisite hot process fluid or they can be fed neat thereto. These derivatives are especially effective when added to the liquid hydrocarbonaceous medium during the heat processing thereof at temperatures of from 200°–550° C.

The following examples are included as being illustrative of the invention and should not be construed as limiting the scope thereof.

EXAMPLES

Preparation-Reaction Product Polyalkenylsuccinic anhydride-diphenylamine-pentaerythritol (PBSAPP)

Polyisobutenylsuccinic anhydride (Ms≈1300 isobutenyl moiety) was reacted with diphenylamine in a 1:1 mole ratio. The resulting polyisobutenylsuccinimide was then reacted with pentaerythritol according to example 1 of U.S. Pat. No. 4,895,579 (Andress et al). The PBSAPP reaction product was diluted with mineral oil (Mentor 28) to a 50% concentration.

Efficacy

In order to ascertain the efficacy of the reaction products in inhibiting deposit formation in liquid hydrocarbonaceous mediums during elevated temperature treatment, test materials were subjected to a dual fouling apparatus test. In the dual fouling apparatus, process fluid (crude oil) is pumped from a Parr bomb through a heat exchanger containing an electrically heated rod. Then the process fluid is chilled back to room temperature in a water-cooled condenser before being remixed with the fluid in the bomb.

The Dual Fouling Apparatus (DFA) used to generate the data shown in the following Tables contains two independent, heated rod exchangers. In the DFA tests, rod temperature was controlled while testing. As fouling on the rod occurs, less heat is transferred to the fluid so that the process fluid outlet temperature decreases. Antifoulant protection was determined by comparing the summed areas between the heat transfer curves for control and treated runs and the ideal case for each run. In this method, the temperatures of the oil inlet and outlet and rod temperatures at the oil inlet (cold end) and outlet (hot end) are used to calculate U-rig coefficients of heat transfer every 2 minutes during the tests. From these U-rig coefficients, areas under the fouling curves are calculated and subtracted from the non-fouling curve for each run. Comparing the areas of control runs (averaged) and treated runs in the following equation results in a percent protection value for antifoulants.

$$\frac{\text{Avg. }\Delta\text{Area(control)} - \Delta\text{Area(treatment)}}{\text{Avg. }\Delta\text{Area(control)}} \times 100 = \% \text{ protection}$$

Results are shown in Table I.

TABLE I

| Additive | Desalted Crude Oil A 482° C. Rod Temperature | |
|---|---|---|
| | (ppm) | % Protection |
| PIBSI | 62.5 | 8 (ave.) |
| | 125 | 9 |
| | 250 | 18 |
| PBSAPP | 62.5 | 22 (avg.) |
| | 125 | 39 |

TABLE I-continued

| Additive | Desalted Crude Oil A 482° C. Rod Temperature | |
|---|---|---|
| | (ppm) | % Protection |
| | 250 | 13 (avg.) |

PIBSI = polyisobutenylsuccinimide mw isobutenyl moiety ≈ 1300, available Lubrizol
PBSAPP = Reaction product of polyisobutenyl succinic anhydride -diphenylamine - and pentaerythritol made in accord with the preparation example supra.

Additional tests with the dual fouling apparatus were undertaken to confirm the test results reported in Table I supra. These tests are reported in Table II.

TABLE II

| Crude Oil | Additive | PPM Active | Rod Temperature °C. | % Protection |
|---|---|---|---|---|
| B | PIBSI | 62.5 | 454 | 17 |
| B | PIBSI | 250 | 454 | 17 |
| B | PBSAPP | 250 | 454 | 33 |
| C | PIBSI | 250 | 413 | 42 |
| C | PBSAPP | 250 | 413 | 8 |
| C | PIBSI | 250 | 440 | 50 |
| D | PIBSI | 250 | 316 | 9 |
| D | PBSAPP | 250 | 316 | 0 |
| D | PIBSI | 500 | 316 | 33, 97 (65 avg.) |
| D | PBSAPP | 500 | 316 | 17 |

DISCUSSION

The PBSAPP reaction product is more effective in inhibiting fouling of the tested crude oil A heated liquid hydrocarbonaceous medium, at the lower, more economically attractive dosages of 62.5 ppm and 125 ppm, than the commercially available polyisobutenylsuccinimide. Also, PBSAPP is more effective at equivalent dosages than PIBSI when tested in crude oil B.

In accordance with the patent statutes, the best mode of practicing the invention has been set forth.

However, it will be apparent to those skilled in the art that many other modifications can be made without departing from the invention herein disclosed and described.

What is claimed is:

1. A method of inhibiting fouling deposit formation in a liquid hydrocarbonaceous medium during heat treatment processing thereof, at a temperature of from about 200° C.–550° C., wherein, in the absence of such antifouling treatment, fouling deposits are normally formed as a separate phase within said liquid hydrocarbonaceous medium impeding process throughput and thermal transfer, said method comprising adding to said heat treated liquid hydrocarbonaceous medium, an antifouling amount of from about 0.5–10,000 parts by weight based upon one million parts of said hydrocarbonaceous medium of a reaction product of (a) polyalkenylsuccinic acid, $C_1$–$C_6$ alkyl mono- or diester of said acid or polyalkenylsuccinic anhydride having the formula

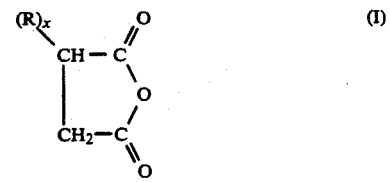

(I)

wherein R is an aliphatic alkenyl or alkyl moiety having between 50 and 200 carbon atoms,
(b) a secondary aromatic amine having the formula

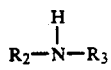 (II)

wherein $R_2$ and $R_3$ are independently chosen from aryl and $C_1$-$C_{18}$ alkaryl; and
(c) a hindered alcohol having the formula

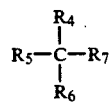 (III)

wherein $R_4$, $R_5$ and $R_6$ are independently chosen from H, $CH_2OH$, and OH; and wherein $R_7$ is $CH_2OH$, $CH_2OH$ substituted lower alkyl ($C_1$-$C_6$), OH substituted lower alkyl ($C_1$-$C_6$), $CH_2OH$ and OH substituted lower alkyl ($C_1$-$C_6$), $CH_2$—O—$R_8$ or —O—$R_8$ wherein $R_8$ is lower alkyl ($C_1$-$C_6$), OH substituted lower alkyl ($C_1$-$C_6$) or $CH_2OH$ substituted lower alkyl ($C_1$-$C_6$).

2. A method as recited in claim 1 wherein said hydrocarbonaceous medium comprises crude oil.

3. A method as recited in claim 1 wherein R comprises a repeated isobutenyl moiety, wherein the molecular weight Mw of R is about 1300.

4. A method as recited in claim 3 wherein $R_2$ and $R_3$ are both phenyl.

5. A method as recited in claim 4 wherein $R_4$, $R_5$, $R_6$ and $R_7$ are all $CH_2OH$.

* * * * *